R. R. GASKILL.
Wheel-Plow.
No. 52,558. Patented Feb. 13, 1866
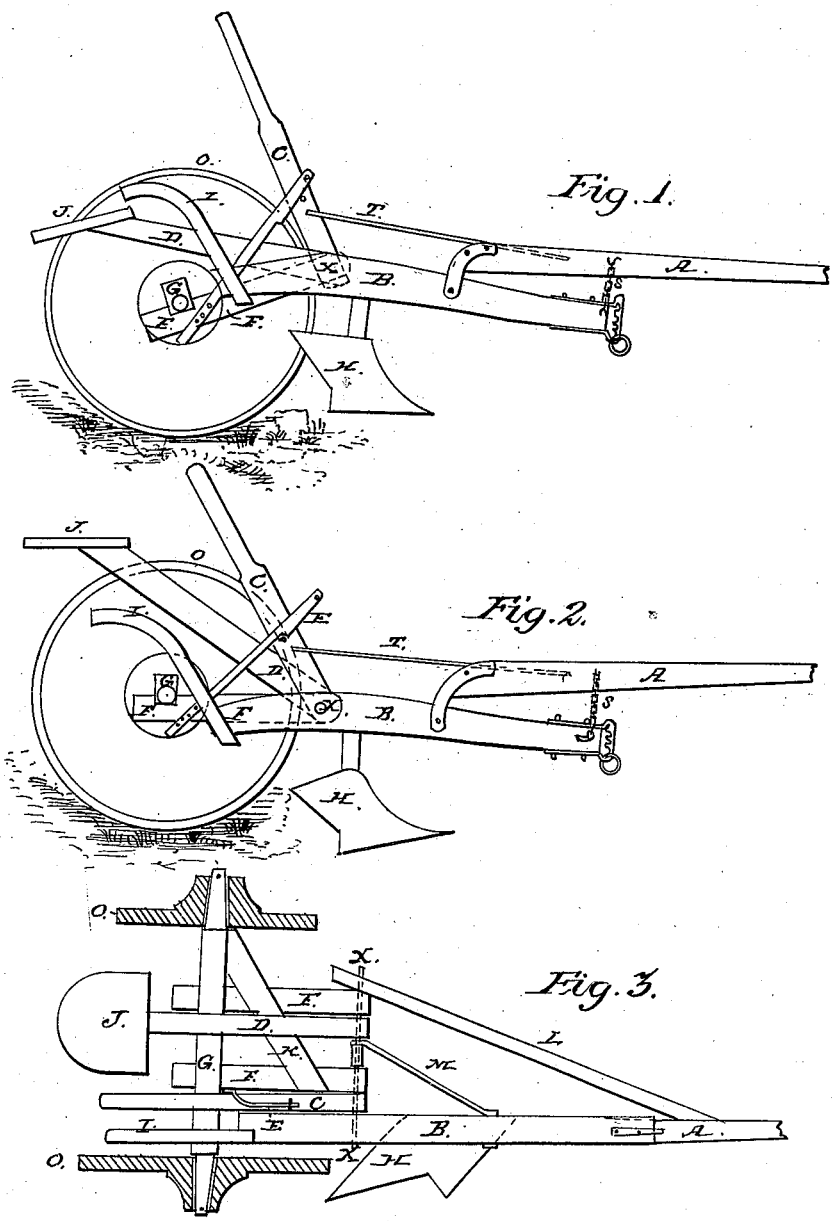
WITNESSES:
John T. Harper
William G. Raw
INVENTOR:
Roland R. Gaskill

UNITED STATES PATENT OFFICE.

ROLAND R. GASKILL, OF EL PASO, ILLINOIS.

IMPROVEMENT IN GANG-PLOWS.

Specification forming part of Letters Patent No. 52,558, dated February 13, 1866.

*To all whom it may concern:*

Be it known that I, ROLAND R. GASKILL, of El Paso, in the county of Woodford and State of Illinois, have invented a new and Improved Mode of Applying Wheels to Plows such as the agriculturalists have in their possession or may from time to time obtain; and I do hereby declare that the following is a full and exact description thereof, reference being had to the accompanying drawings, and to the letters of reference marked thereon.

The nature of my invention consists in providing a common stirring-plow of any of the patterns with wheels in such a manner as will enable the plowman to ride while plowing, and is very useful and convenient.

To enable others skilled in the art to make and use my invention, I will proceed to describe its construction and operation.

I construct my invention after the form of the accompanying drawings, marked respectively Figures 1, 2, and 3. Fig. 1 represents it when out of the ground and the mode of raising it. Fig. 2 shows it when in the ground and the mode of securing it in the ground. Fig. 3 is a top view, showing its construction and the mode of attaching it to the plows.

Axle G is located in the rear of the plow H, to which are attached wheels O O, one of the wheels running in the furrow close in the rear of plow H, the other on the unplowed land.

Bars F F are attached at their rear ends to axle G, running forward and parallel with and attaching to beam B at the point marked X X.

At the point marked X X a bolt passes through beam B, bars F F, lever C, seat-bar M, and brace L, which forms a hinge or joint with beam B, permitting the plowman to raise the plow out of the ground for the purpose of turning around at the ends or for transporting the plow from place to place.

When it is desired that the plow should enter the ground the plowman draws backward on lever C until hook E becomes engaged with pin in lever C.

When it is desired the plow should be raised from the ground, hook E is disengaged from pin in lever C, when the operator's weight will serve to raise the plow.

Tongue A is hinged to beam B near the middle thereof, or directly over the share H, the forward end extending between the animals drawing the plow, and is supported by the neck-yoke.

Tongue A, being hinged to beam B, as shown, operating in combination with brace L, hinge X X, bars F F, brace K, and axle G, serves the purposes of guiding the plow and raising and lowering the same.

Chain S suspends the end of beam B when the plow is being raised from the ground.

Having thus described the nature and object of my invention, what I claim as new, and desire to secure by Letters Patent, is—

Hinging the tongue A to plow-beam B at the middle thereof, or directly above the share H, in combination with brace L, hinge X X, bars F F, brace K, and axle-tree G, the several parts being arranged as and for the purpose set forth.

ROLAND R. GASKILL.

Witness:
MONT. S. ANDRESS.